US009819710B2

(12) United States Patent
Anderson et al.

(10) Patent No.: US 9,819,710 B2
(45) Date of Patent: Nov. 14, 2017

(54) EASY SHARING OF WIRELESS AUDIO SIGNALS (75) Inventors: Jeff Anderson, Camas, WA (US); Philippe Depallens, San Clemente, CA (US); Shimon Shmueli, Troutdale, OR (US)

(73) Assignee: Logitech Europe S.A., Lausanne (CH)

( * ) Notice: Subject to any disclaimer, the term of this patent is extended or adjusted under 35 U.S.C. 154(b) by 308 days.

(21) Appl. No.: 13/567,203

(22) Filed: Aug. 6, 2012

(65) Prior Publication Data

US 2013/0117693 A1 May 9, 2013

Related U.S. Application Data (60) Provisional application No. 61/527,308, filed on Aug. 25, 2011.

(51) Int. Cl.
*H04L 29/04* (2006.01)
*G06F 3/048* (2013.01)
*H04L 29/06* (2006.01)
*H04W 4/00* (2009.01)

(52) U.S. Cl.
CPC ............ *H04L 65/403* (2013.01); *G06F 3/048* (2013.01); *H04L 65/1093* (2013.01); *H04L 65/4069* (2013.01); *H04L 65/4076* (2013.01); *H04W 4/008* (2013.01)

(58) Field of Classification Search
CPC ............ H04L 65/4069; H04L 65/4076; H04L 65/1093; H04L 65/403; H04W 4/008
USPC ........................................................ 715/753
See application file for complete search history.

(56) References Cited

U.S. PATENT DOCUMENTS

| | | | | | |
|---|---|---|---|---|---|
| 3,676,781 | A | * | 7/1972 | Worcester | 455/156.1 |
| 4,607,395 | A | * | 8/1986 | Sundahl | 455/351 |
| 4,782,527 | A | * | 11/1988 | Williamson et al. | 379/430 |
| 4,845,751 | A | * | 7/1989 | Schwab | 381/311 |
| 5,404,577 | A | * | 4/1995 | Zuckerman et al. | 455/66.1 |
| 5,438,702 | A | * | 8/1995 | Jackson | 455/575.2 |
| 6,256,303 | B1 | * | 7/2001 | Drakoulis et al. | 370/344 |
| 6,769,028 | B1 | * | 7/2004 | Sass et al. | 709/231 |
| 6,980,165 | B2 | * | 12/2005 | Yuasa et al. | 343/718 |

(Continued)

FOREIGN PATENT DOCUMENTS

| | | |
|---|---|---|
| CN | 101645717 A | 2/2010 |
| CN | 101652943 A | 2/2010 |
| CN | 101867574 A | 10/2010 |

OTHER PUBLICATIONS

Notification of the First Office Action, dated Feb. 4, 2015, in Chinese Patent Application No. 21210306280.X, (with English Translation), 22 pages.

(Continued)

*Primary Examiner* — Nicholas Klicos
(74) *Attorney, Agent, or Firm* — Kilpatrick Townsend & Stockton LLP (57) ABSTRACT One embodiment of the invention is directed to a method comprising receiving, at a first media output device, streaming media from a media source device, receiving, at the first media output device, a command by motion or voice to share the streaming media with a second media output device, and initiating, by the first media output device, sharing of the streaming media between the first media output device and the second media output device.

12 Claims, 10 Drawing Sheets

(56) References Cited

U.S. PATENT DOCUMENTS

| | | | |
|---|---|---|---|
| 6,987,947 B2* | 1/2006 | Richenstein et al. | 455/3.06 |
| 7,031,475 B2* | 4/2006 | Kuraoka et al. | 381/74 |
| 7,095,866 B1* | 8/2006 | Drakoulis et al. | 381/311 |
| 8,266,551 B2* | 9/2012 | Boldyrev | G06F 9/542 715/701 |
| 2001/0002928 A1* | 6/2001 | Cummins | 379/430 |
| 2001/0031622 A1* | 10/2001 | Kivela et al. | 455/11.1 |
| 2002/0002035 A1* | 1/2002 | Sim et al. | 455/41 |
| 2002/0039424 A1* | 4/2002 | Watanuki | 381/74 |
| 2003/0003871 A1* | 1/2003 | Urso | 455/66 |
| 2003/0036360 A1* | 2/2003 | Russell et al. | 455/66 |
| 2003/0059071 A1* | 3/2003 | Dunham | 381/309 |
| 2003/0100274 A1* | 5/2003 | Brown | 455/90 |
| 2003/0212804 A1* | 11/2003 | Hashemi | 709/228 |
| 2004/0114036 A1* | 6/2004 | Karaoguz et al. | 348/142 |
| 2005/0030255 A1* | 2/2005 | Chiu | G06F 3/04883 345/1.3 |
| 2005/0094838 A1* | 5/2005 | Tomoda et al. | 381/370 |
| 2005/0232436 A1* | 10/2005 | Nagayasu et al. | 381/74 |
| 2005/0281422 A1* | 12/2005 | Armstrong et al. | 381/311 |
| 2006/0079213 A1* | 4/2006 | Herberger et al. | 455/414.1 |
| 2006/0190968 A1* | 8/2006 | Jung et al. | 725/74 |
| 2006/0256074 A1* | 11/2006 | Krum | G06F 1/1626 345/156 |
| 2007/0124503 A1* | 5/2007 | Ramos | G06F 3/017 709/248 |
| 2007/0191008 A1* | 8/2007 | Bucher et al. | 455/435.2 |
| 2007/0233905 A1* | 10/2007 | Hatano et al. | 710/16 |
| 2007/0296696 A1* | 12/2007 | Nurmi | 345/158 |
| 2008/0109550 A1* | 5/2008 | Tedesco et al. | 709/228 |
| 2008/0132798 A1* | 6/2008 | Hong | A61B 5/6815 600/508 |
| 2008/0175403 A1 | 7/2008 | Tan et al. | |
| 2009/0017799 A1* | 1/2009 | Thorn | 455/414.1 |
| 2009/0097672 A1* | 4/2009 | Buil | G06F 21/10 381/80 |
| 2009/0097689 A1* | 4/2009 | Prest et al. | 381/380 |
| 2009/0144391 A1* | 6/2009 | Jung et al. | 709/217 |
| 2009/0153288 A1* | 6/2009 | Hope et al. | 340/3.1 |
| 2009/0290720 A1* | 11/2009 | Johnson | H04R 1/1025 381/74 |
| 2010/0153576 A1* | 6/2010 | Wohlert et al. | 709/231 |
| 2010/0257251 A1* | 10/2010 | Mooring et al. | 709/216 |
| 2010/0287238 A1* | 11/2010 | Setton et al. | 709/204 |
| 2010/0299390 A1* | 11/2010 | Alameh | G06F 3/017 709/204 |
| 2010/0303014 A1* | 12/2010 | McMullin | H04W 84/18 370/328 |
| 2011/0072078 A1* | 3/2011 | Chai et al. | 709/203 |
| 2011/0231783 A1* | 9/2011 | Nomura | G06F 3/0488 715/761 |
| 2011/0285554 A1* | 11/2011 | Aghaei et al. | 341/33 |
| 2012/0002822 A1* | 1/2012 | Peissig et al. | 381/74 |
| 2012/0011266 A1* | 1/2012 | Avasarala | 709/231 |
| 2012/0015613 A1* | 1/2012 | Zelson et al. | 455/90.1 |
| 2012/0050153 A1* | 3/2012 | Dvortsov | H04W 12/04 345/156 |
| 2012/0052852 A1* | 3/2012 | Goldman | H04M 1/6058 455/418 |
| 2012/0072451 A1* | 3/2012 | Merrifield et al. | 707/771 |
| 2012/0189140 A1* | 7/2012 | Hughes | H04M 3/56 381/123 |
| 2012/0208514 A1* | 8/2012 | Park et al. | 455/418 |
| 2012/0324559 A1* | 12/2012 | Ran et al. | 726/9 |

OTHER PUBLICATIONS

Notification of the Second Office Actions, dated Oct. 12, 2015, in Chinese Patent Application No. 21210306280.X, (including English Translation), 26 pages.

* cited by examiner

EASY SHARING OF WIRELESS AUDIO SIGNALS

CROSS-REFERENCES TO RELATED APPLICATIONS

The present application is a non-provisional application of and claims priority to U.S. Provisional Application No. 61/527,308, filed on Aug. 25, 2011, the entire contents of which are herein incorporated by reference for all purposes.

BACKGROUND OF THE INVENTION

Due to bandwidth and other technical limitations, current technologies, such as Bluetooth, do not have the ability to stream audio from a source to multiple devices at the same time. Thus, if a user desires to stream audio from his cell phone to multiple devices, this is not possible with the current Bluetooth technology.

Wireless technologies, such as technologies from SMSC, enable sharing (broadcast) of wireless audio signals. Some of these technologies require both ends of the link to either initiate or accept the stream. Other technologies have one node designated as the broadcaster that broadcasts constantly or when instructed to do so, and any other receiver node can receive that signal when commanded to do so. Some technologies allow these roles to reverse when instructed to do so. Yet other technologies require a server or cloud technology to share data (e.g., files) between two source devices, a do not allow for sharing directly between two devices.

Technology from companies such as Cambridge Silicon Radio (CSR), allow a wireless headphone that is Bluetooth connected to a music source, such as an iPhone, to establish an ad-hoc connection and re-transmit the audio stream to another wireless Bluetooth device such as a headphone. This technology enables the first user to share what they are currently listening to with another person using a compatible wireless headphone. However, this technology simply enables sharing and does not address the issues of usability and use models for how the sharing may occur. The challenge to this technology is making the act of sharing (pairing) and terminating the sharing simple and easy for a non-technical person to use. These technologies do not provide the mechanisms for how to initiate the act of sharing in a consumer friendly way. Other issues include ensuring that a user is sharing his audio with the intended share-ee, and that the sharing states are not entered into accidentally.

Embodiments of the invention solve these and other problems individually and collectively.

BRIEF SUMMARY OF THE INVENTION

Embodiments of the invention are directed to systems, apparatuses, and methods to allow for easy sharing of media from one media output device from a first user (e.g., music from one listener's headphones) to another media output device of another user (e.g., another listener's headphones) wirelessly.

One embodiment of the invention is directed to a method comprising receiving, at a first media output device, streaming media from a media source device, receiving, at the first media output device, a command by motion or voice to share the streaming media with a second media output device, and initiating, by the first media output device, sharing of the streaming media between the first media output device and the second media output device.

Another embodiment of the invention is directed to a method comprising receiving, at a first media output device, streaming media from a media source device, activating, by a first media output device, a beacon to share-out the streaming media, receiving a command to share-in from at least a second media output device, wherein the command is based on a motion or voice command on the second media output device, and initiating, by the first media output device, sharing of the streaming media from the first media output device to the second media output device.

Another embodiment of the invention is directed to a media output device configured to receive streaming media from a media source device, receive a command by motion or voice command to share the streaming media with a second media output device, and initiate sharing of the streaming media between the first media output device and the second media output device.

Another embodiment of the invention is directed to a media output device configured to receive streaming media from a media source device, activate a beacon to share-out the streaming media, receive a command to share-in from at least a second media output device, wherein the command is based on a motion or voice command on the second media output device, and initiate sharing of the streaming media from the first media output device to the second media output device.

These and other embodiments of the invention are described in further detail below.

DETAILED DESCRIPTION OF THE INVENTION

Embodiments of the invention provide for various methods, procedures and associated technologies that can be deployed to make the sharing technology in a headphone application (for example) simple and easy to use (e.g., real time sharing/streaming audio/video). Embodiments of the invention are shown in FIGS. 1-10 and discussed in further detail below.

Figure 8:
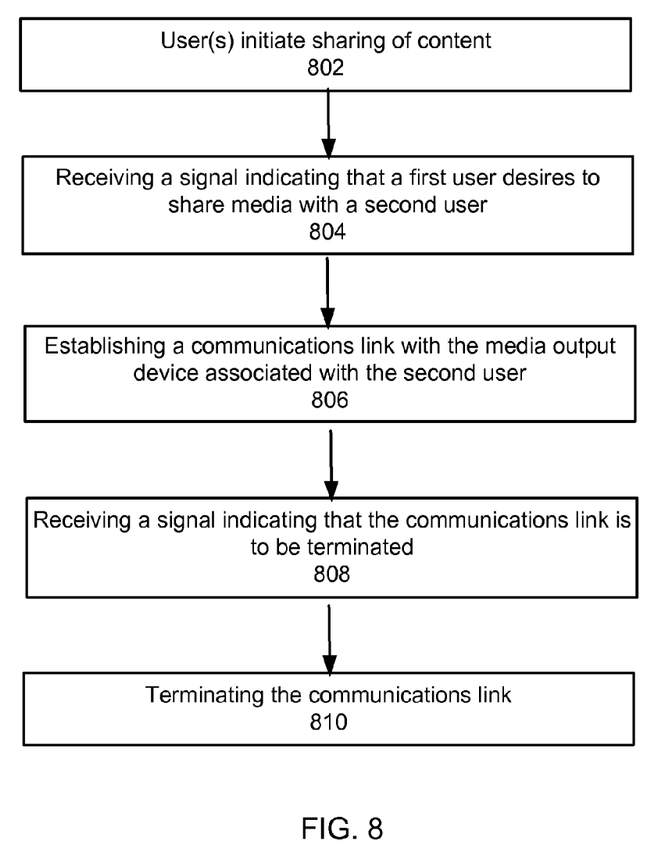
FIGS. 8-10 show a flow charts of methods according to embodiments of the invention.

In one embodiment of the invention user A may be listening to content on his media output device (e.g., headphones or headset) that is connected to his media source device (e.g., Smartphone). User A's headphones may be connected to his music player via a wire or via wireless connection (e.g., Bluetooth or other technology). User B may want to listen to what user A is listening to via user B's media output device (e.g., headphones or headset). One or more of the headphones may contain a control unit for providing the capability for the users to share. Referring to FIG. 8, user A or B may initiate sharing the content by bumping the two headphones together, engaging a button or switch on their headphones, using voice command, using a motion or gesture with the headphones, or using an application on the media source device (802). All of these methods are described in further detail below. The control unit would then receive an indication from one or both users that the users desire to share the content (804). In one embodiment, the control unit would establish a connection between the two headphones (e.g., establish a persistent communication channel or pipe) (806) and then consumption of the content would be enabled on user B's headphones. In one embodiment the connection between user A's headphones and user B's headphones may be maintained until sharing is terminated. Sharing may be terminated by a number of methods. For example, termination may occur when initiated by a user, when one of the user goes out of range, when a user receives a phone call, when a predetermined period of time elapses, etc. In one embodiment, the control unit would receive an indication that the sharing is to be terminated (808), and would terminate the connection (810).

Figure 9:
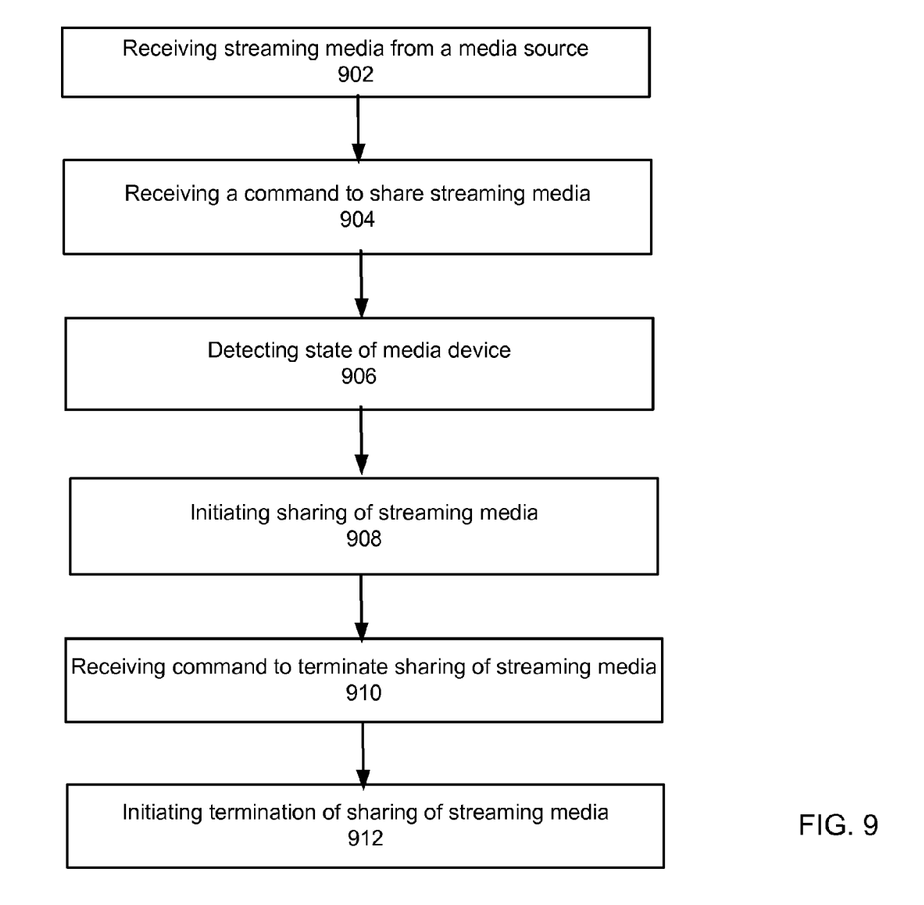

FIG. 9 outlines the communications received at a first media output device (e.g., a headphone, speaker, earbud, headset, etc.) according to an embodiment of the invention. First, a first media output device receives streaming media from a media source (902) (e.g., mobile phone, smart phone, tablet, personal digital assistant, MP3 player, portable radio, portable DVD player, receiver, laptop, personal computer, etc.). Streaming media may include multimedia files (e.g., audio and/or video) that start to play in a steady and continuous flow, almost immediately upon downloading. In contrast, an ordinary multimedia file may be downloaded, and decompressed and saved, in its entirety before it can be played. Streaming may occur at a media output device where it may be decompressed while it is being downloaded and converted into sound and/or video.

Next the first media output device may receive a command, by motion or voice to share the streaming media with a second media output device (904). This command will inform the media output device control unit or microcontroller that a share state is desired and take appropriate action to establish a link between the devices (e.g., an audio link). The appropriate action will depend on the technology used to transmit the multimedia data from one device to another. Various examples of commands by motion or voice are described below (e.g., bump, motion, gesture, voice, etc.). For example, the command by motion to share the streaming media may include a bump between the first media output device and the second media output device, or a gesture by the first media output device and the second media output device.

The state of the first media output device may need to be detected (906) to determine whether to share the streaming media from the first media output device to the second media output device or from the second media output device to the first media output device (e.g., which device is the share-out and which device is the share-in). This can be determined from previous states or through direct command from a user. Various methods of detecting the state of a media output device are described below (e.g., detecting a bump in an out zone or an in zone on a media device, detecting that a button has been engaged on a media device, detecting a particular motion or gesture on a media output device, etc.).

Next the media output device initiates sharing of the streaming media (908) between the first media output device and the second media output device. Information may need to be exchanged to establish an audio and or video communications link. This "Set-up" data may be communicated via provisions in the protocol of the communications link (such a case may be that the communications link technology already contains provisions to seek share partners once the state has been entered into to, and establish the link when partners are found), or this set-up data could be communicated in an "out-of-band" link that was established when the share command were initiated. For example, if using Near Field Communication (NFC) to initiate the pair states, the NFC radio communication may contain the communicaitons link set-up data that is then passed on to the audio radio link system (for example) by the control unit or microcontroller. For example, if using infrared (IR) to initiate the pair states, the IR channel may communicate the set-up data to the audio radio link system.

Set up data may contain one ore more of the following: Address (Buletooth (BT) address, MAC address, IP Address, UUI, etc.) of the radios, RF channel of the radios, Security information may be needed to set up a private and secure link, protocol information, modulation information, hop sequences, and many other essential data needed by the audio radio systems to establish an audio transmission link between the two devices.

For example, in the case of Bump, the near-field technology, whether RF (such as NFC) or IR, may be used to exchange wireless link information between the two devices. The wireless link information may contain information about the protocol uses, RF channels used, the address (BT, MAC, IP, etc.), and other essential information needed to set up the two wireless sub-systems embedded in the devices to communicate with each other.

The sharing of the streaming media between the first media output device and the second media output device may continue (e.g., maitaining a sustained connection) until a command to terminate the sharing of the streaming media is received at the first media output device or the second media output device. The media output device may receive a command to terminate sharing of the streaming media between the first media output device and the second media output device (910). Various examples of commands by motion or voice are described below (e.g., bump, motion, gesture, voice, etc.). For example, the command by motion to terminate the streaming media may include a bump between the first media output device and the second media output device, an engaged button or switch on the first media output device or the second media output device, a motion or gesture by the first media output device and the second media output device, or a voice command on the first media output devise or the second media output device.

The media output device may initiate termination of sharing of the streaming media (912). When termination of the audio sharing link is desired or required, the radios may appropriately close the link as required by the protocol and/or cease to transmit or receive the audio data.

Figure 10:
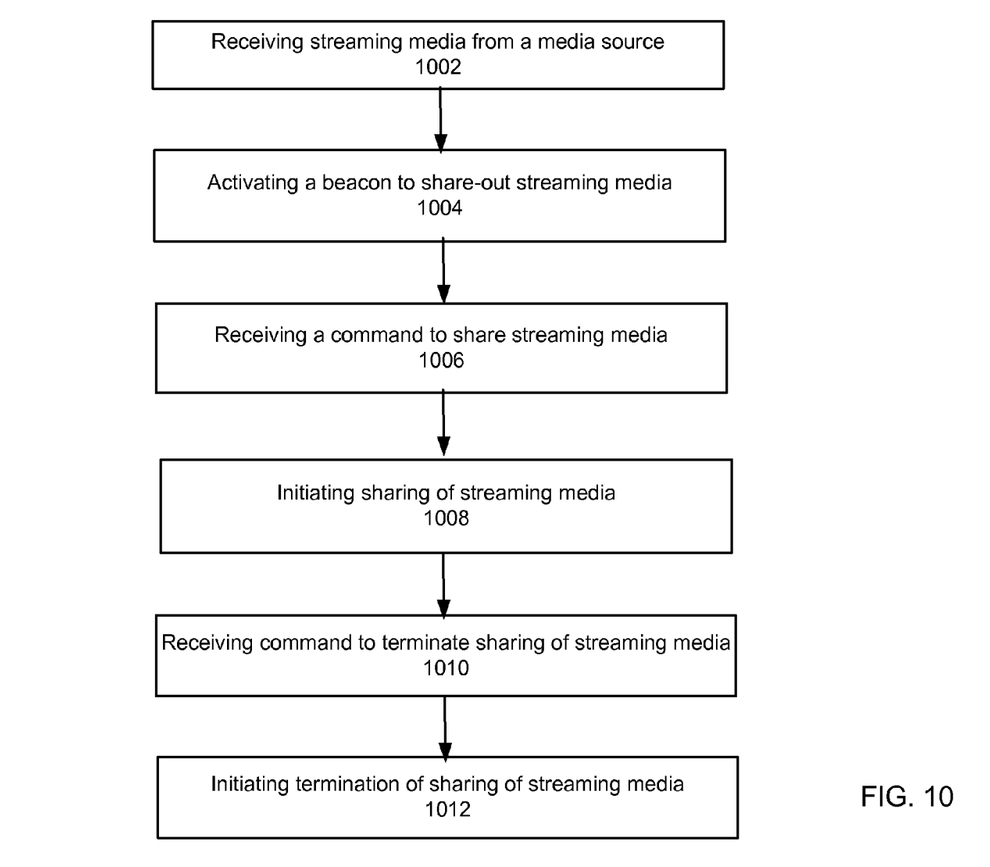

FIG. 10 outlines the communications received at a first media output device (e.g., a headphone, speaker, earbud, headset, etc.) according to an embodiment of the invention. First, a first media output device receives streaming media from a media source (1002) (e.g., mobile phone, smart phone, tablet, personal digital assistant, MP3 player, portable radio, portable DVD player, receiver, laptop, personal computer, etc.). Streaming media may include multimedia files (e.g., audio and/or video) that start to play in a steady and continuous flow, almost immediately upon downloading. In contrast, an ordinary multimedia file may be downloaded, and decompressed and saved, in its entirety before it can be played. Streaming may occur at a media output device where it may be decompressed while it is being downloaded and converted into sound and/or video.

Next the first media output device may activate a beacon to share-out the streaming media (1004). For example, a beacon such as a light, may be activated on the first media output device. The activation for the beacon may also activate the share-out state for the media output device that may broadcast a corresponding wireless signal.

The first media output device may receive a command to share-in from at least a second media output device, wherein the command is based on a motion or voice command on the second media output device (1006). (The first media output device may receive a command to share-in from a third media output device, etc.). This command will inform the media output device control unit or microcontroller that a share state is desired and take appropriate action to establish a link between the devices (e.g., an audio link). The appropriate action will depend on the technology used to transmit the multimedia data from one device to another. Various examples of commands by motion or voice are described below (e.g., bump, motion, gesture, voice, etc.). For example, the command by motion to share the streaming media may include a bump between the first media output device and the second media output device, or a gesture by the first media output device and the second media output device.

Next the media output device initiates sharing of the streaming media (1008) between the first media output device and the second media output device. Information may need to be exchanged to establish an audio and or video communications link. This "Set-up" data may be communicated via provisions in the protocol of the communications link (such a case may be that the communications link technology already contains provisions to seek share partners once the state has been entered into to, and establish the link when partners are found), or this set-up data could be communicated in an "out-of-band" link that was established when the share command were initiated. For example, if using Near Field Communication (NFC) to initiate the pair states, the NFC radio communication may contain the communicaitons link set-up data that is then passed on to the audio radio link system (for example) by the control unit or microcontroller. For example, if using infrared (IR) to initiate the pair states, the IR channel may communicate the set-up data to the audio radio link system.

Set up data may contain one ore more of the following: Address (Buletooth (BT) address, MAC address, IP Address, UUI, etc.) of the radios, RF channel of the radios, Security information may be needed to set up a private and secure link, protocol information, modulation information, hop sequences, and many other essential data needed by the audio radio systems to establish an audio transmission link between the two devices.

For example, in the case of Bump, the near-field technology, whether RF (such as NFC) or IR, may be used to exchange wireless link information between the two devices. The wireless link information may contain information about the protocol uses, RF channels used, the address (BT, MAC, IP, etc.), and other essential information needed to set up the two wireless sub-systems embedded in the devices to communicate with each other.

The sharing of the streaming media between the first media output device and the second media output device may continue (e.g., maitaining a sustained connection) until a command to terminate the sharing of the streaming media is received at the first media output device or the second media output device. The media output device may receive a command to terminate sharing of the streaming media between the first media output device and the second media output device (1010). Various examples of commands by motion or voice are described below (e.g., bump, motion, gesture, voice, etc.). For example, the command by motion to terminate the streaming media may include a bump between the first media output device and the second media output device, an engaged button or switch on the first media output device or the second media output device, a motion or gesture by the first media output device and the second media output device, or a voice command on the first media output devise or the second media output device.

The media output device may initiate termination of sharing of the streaming media (1012). When termination of the audio sharing link is desired or required, the radios appropriately close the link as required by the protocol and/or cease to transmit or receive the audio data.

"Bump" Sharing

In one embodiment of the invention, user A may be listening to his content on his media output device (e.g., headphones) that is connected to his music source (such as an iPhone). User A's headphones may be connected to his music player via a wire or via wireless connection (e.g., Bluetooth or other technology). User B wants to listen to what user A is listening to. They may engage in communications to agree to share. User B simply takes off his compatible media output device (e.g., headphones) and "Bumps" them against user A's headphones. An actual physical contact is not necessarily required. It can be that simply placing the two headphones in very close proximity of each other will activate the sharing technology. The objective is that you do not want sharing technology to be activated accidentally. Thus, it may be preferable to utilize an un-natural physical gesture or un-naturally close proximity to minimize errors and insure that only the intended sharer and share-ee are connected.

Examples of technologies that may enable this method include, but are not limited to, Near field Communications (NFC) radio chips, Proximity Pairing Technology from CSR, Optical TX/RX pairs, Inductive TX/RX pairs, Ultrasonics, and physical electrical contacts. The technology would need to initiate the sharing technology state and transfer the required paring information that the Wireless Audio technology requires.

In embodiments of the invention, the various contactless technologies described may be tuned to only establish a communications link when the two headsets are within un-naturally close proximity of each other (e.g., within 2 cm). And in some cases, only specific regions of the headphones where the technology is embedded may be active zone (in other words, only a "Bump" in these areas of the physical headphone would work). This may be a specific area of the earcup or head-band. Of course, physical electrical contacts may require a specific contact area in which physical contact may be made.

Embodiments of the invention provide solutions for a number of usability issues. For example, the headphones may need to know which user is the share-er (or Share-out), and which user is the share-ee (Share-in) so that the music content can flow in the desired direction. One method is for the headphones to know what state they are in. If one is actively listening to music, and the other is not, then the headphones may assume that the one actively listening is the share-out, and the one that is not is the share-in. The microcomputers in each of the headphones may detect these states. Another method is to have buttons on the headphones that user depress to inform the technology of the desired action (e.g., share-out or share-in). Another method is to use different zones of the headset. "Bumping" in the "Out" zone of headset A against the "IN" zone of headset B will initiate the sharing in that direction.

Another usability issue is allowing users to terminate the sharing when they are done. Embodiments of the invention allow users to terminate the sharing when they are done using a variety of methods. For example, when in the active sharing state, "bumping" again could terminate the sharing. Another example includes a button on the headset that may be used to terminate (e.g., either user may depress the button and the sharing will terminate).

Use Buttons and/or Switches to Activate Sharing

In one embodiment of the invention, user A may be listening to his content on his media output device (e.g., headphones) that is connected to his music source (such as an iPhone). User A's headphones could be connected to his music player via a wire or wireless connection (e.g., Bluetooth or other technology). User B may want to listen to what user A is listening to. They may engage in communications to agree to share. The headphones may each have a share-out button and a share-in button. This may be a three position switch or momentary switch wherein sliding the switch in one direction is indicating "share-out" and sliding the switch in the other direction initiates "share-in". User A and User B may engage the intended Share-Out or Share-In button or slide. The wireless systems may then look for the corresponding signal from the other headphone. If the signals (or handshake) is initiated and completed within predetermined time-out period, then the two headphones may connect and share in the directed direction. When the users are done, either user can toggle either of the share buttons or slide to terminate the sharing.

Voice Commands

In one embodiment of the invention, user A may be listening to his content on his media output device (e.g., headphones) that is connected to his music source (such as an iPhone). User A's headphones may be connected to his music player via a wire or wireless connection (e.g., Bluetooth or other technology). User B may want to listen to what user A is listening to. They may engage in communications to agree to share. The headphones may each have a microphone that can receive verbal commands from the user. User A may state a predefined command to share-out, such as "Share-out". User B may state a predefined command to share-in, such as "Share-In". When the commands are received by the headphone microcomputers, the computers seek the corresponding wireless signal from the other user's headphones. If the signals (or handshake) is initiated and completed within pre-determined time-out period, then the two headphones will connect and share in the directed direction. When the users are done, either user can toggle a button or issue a verbal command, such as "Quit sharing," to terminate sharing.

Motion or Gesture

In one embodiment of the invention, user A may be listening to his content on his media output device (e.g., headphones) that is connected to his music source (such as an iPhone). User A's headphones may be connected to his music player via a wire or wireless connection (e.g., Bluetooth or other technology). User B may want to listen to what user A is listening to. They may engage in communications to agree to share. Each of the headphones may contain motion sensors and microcomputer technology that can detect and resolve specific motions or gestures of the headset, or the user's head when the headset is placed on the head. User A makes a predefined motion that is resolved to a Share-Out command. User B makes a predefined motion that is resolved to a Share-In command. When the commands are received by the headphone microcomputers, the computers seek the corresponding wireless signal from the other user's headphones. If the signals (or handshake) is initiated and completed within pre-determined time-out period, then the two headphones will connect and share in the directed direction. When the users are done, either user may toggle a button or perform a predefined motion to terminate the sharing.

Application on Smart Phone

In one embodiment of the invention, user A may be listening to his content on his media output device (e.g., headphones) that is connected to his music source (such as an iPhone). User A's headphones may be connected to his music player via a wire or wireless connection (e.g., Bluetooth or other technology). User B may want to listen to what user A is listening to. They may engage in communications to agree to share. User A's headphone may have a data communications channel open with the music source (the iPhone in this example). User A may open an application that displays a button for sharing out. The application sends the command to User A's headphone to initiate a share-out state. User B may put his headphone into a pairing mode (there are a variety of ways to do this that are common in this industry). User A's headphones may look for other headphones that are in pairing mode. It may transmit the available headphones to the smartphone application and display them to User A. User A may then select the headphone that he wants to pair with. The application communicates that to the headphone and the headphone microcomputer and the microcomputer may accept the pair. If the pair signals (or handshake) is completed within pre-determined time-out period, then the two headphones may connect and share in the directed direction. When the users are done, either user may toggle a button or User A may press a button in the application to terminate the sharing.

Social Connection

In an environment where there are many people in one area, a person who desires to share-out his music to anyone who wants to listen may activate a beacon on his media output device (e.g., headset), such as a light. This beacon indicates to a whole room of people that the User desires to share-out what he is listening to. The activation of the beacon may also activate the share-out state for the headphone that broadcasts the corresponding wireless signal. Any other user with a compatible headphone may engage a share-in command to their headphone. The two headphones may engage in the appropriate wireless handshake to pair and then the sharing commences. Either user may terminate the share with a button or one of the commands described above. In embodiments of the invention, media can be shared with multiple headsets either sequentially, or in broadcast from a single headset.

In addition to music, other examples of media that may be shared between users include video, photographs, etc. For example, two users, each with a media source such as a table PC (e.g., an iPad) may want to share images or a movie with each other. One user may have a movie stored on his iPad that he wants to share with the other user but does not want to actually give the other user a copy. Embodiments of the invention also allow users to share "project" pictures or movies from one device to another using a "bump" gesture or other method described in further detail above and below, to link the two devices (e.g., stream from one mobile device to another).

In another example, a first user may take a picture on his media source device. A second user may want it on his media source device. The media source device of the first user is showing the picture (a possible ready-to-share state), the second user may have a blank page in his photo album on his media source device (a possible ready-to-receive state), Bump (or other pairing mode describe above), and the technology passes the image from the first user's device to the second user's device.

Figure 1:
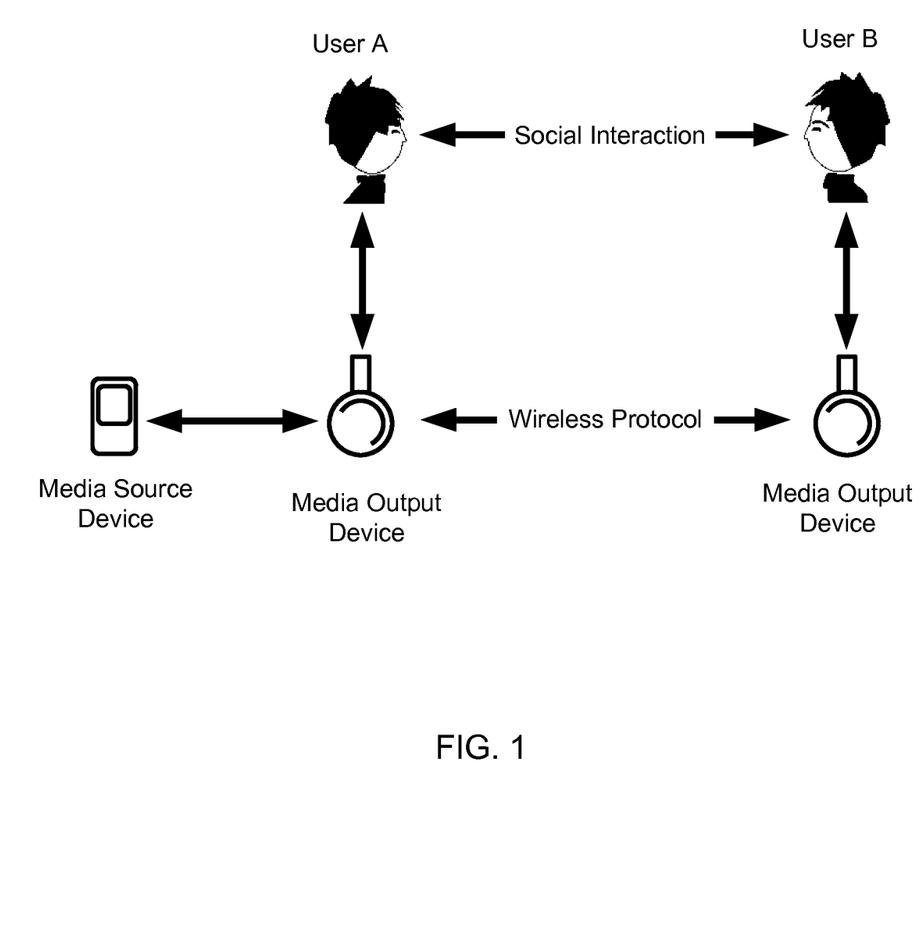
FIGS. 1-4 illustrate diagrams of systems in which various embodiments may be implemented.
Figure 2:
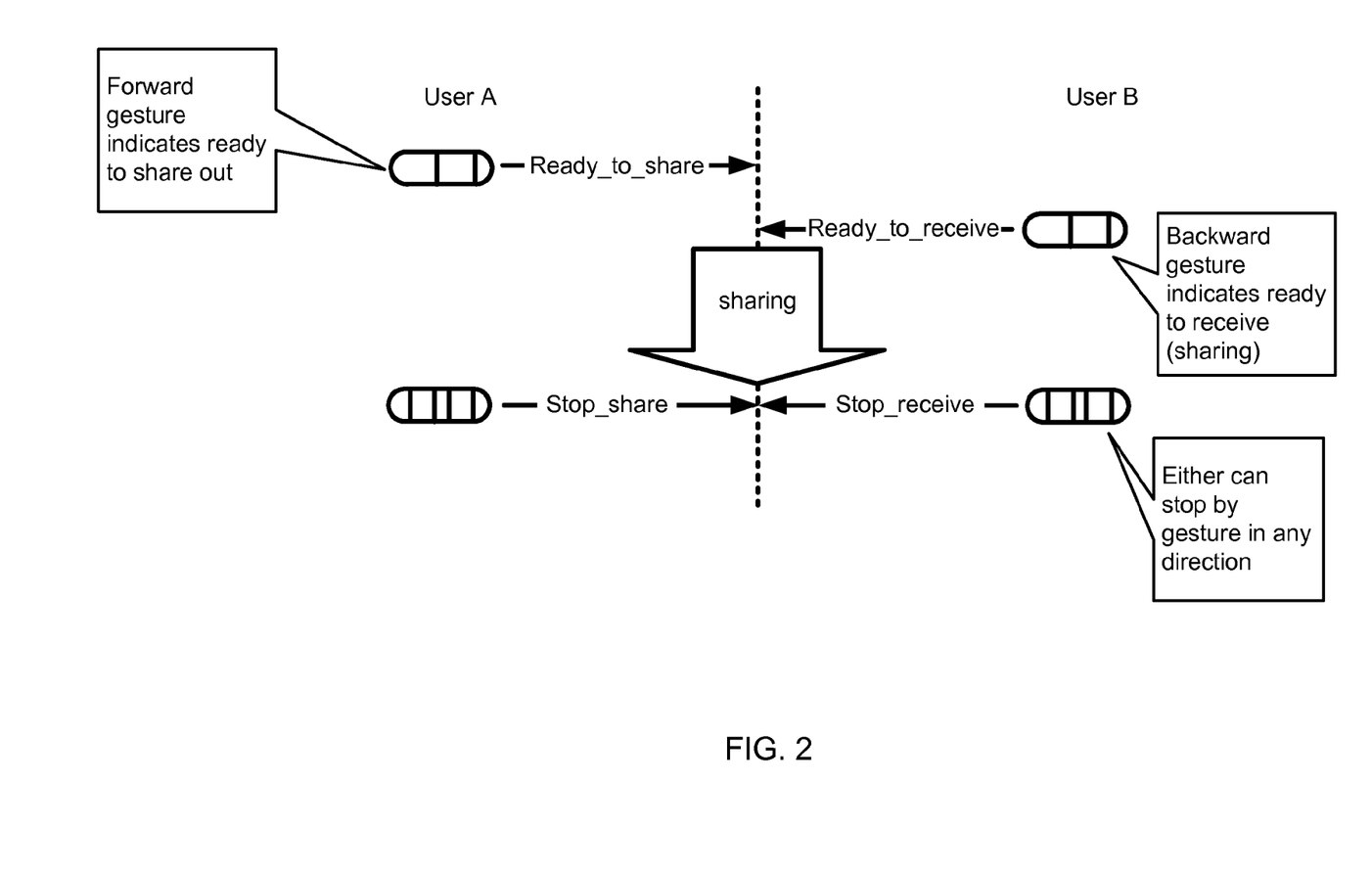
Figure 3:
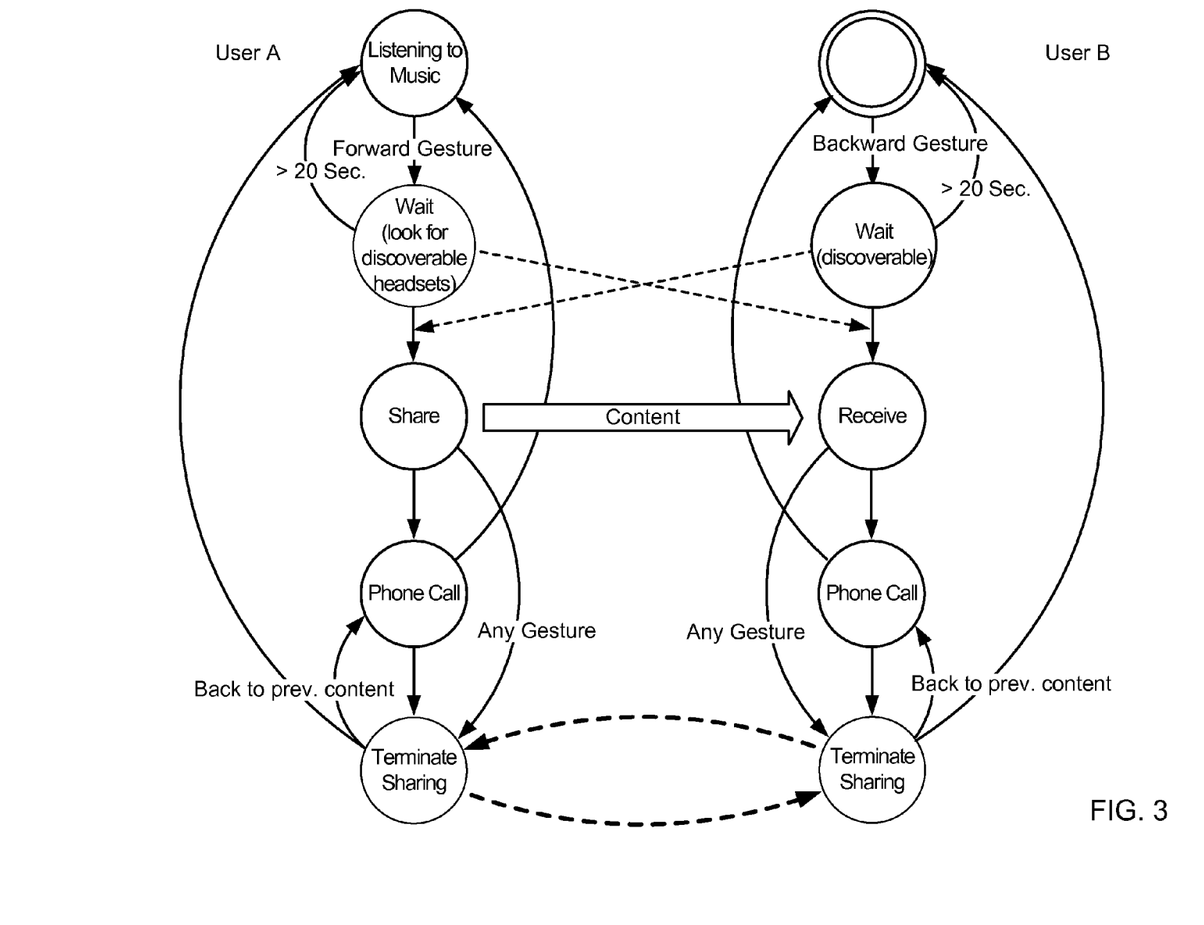
Figure 4:
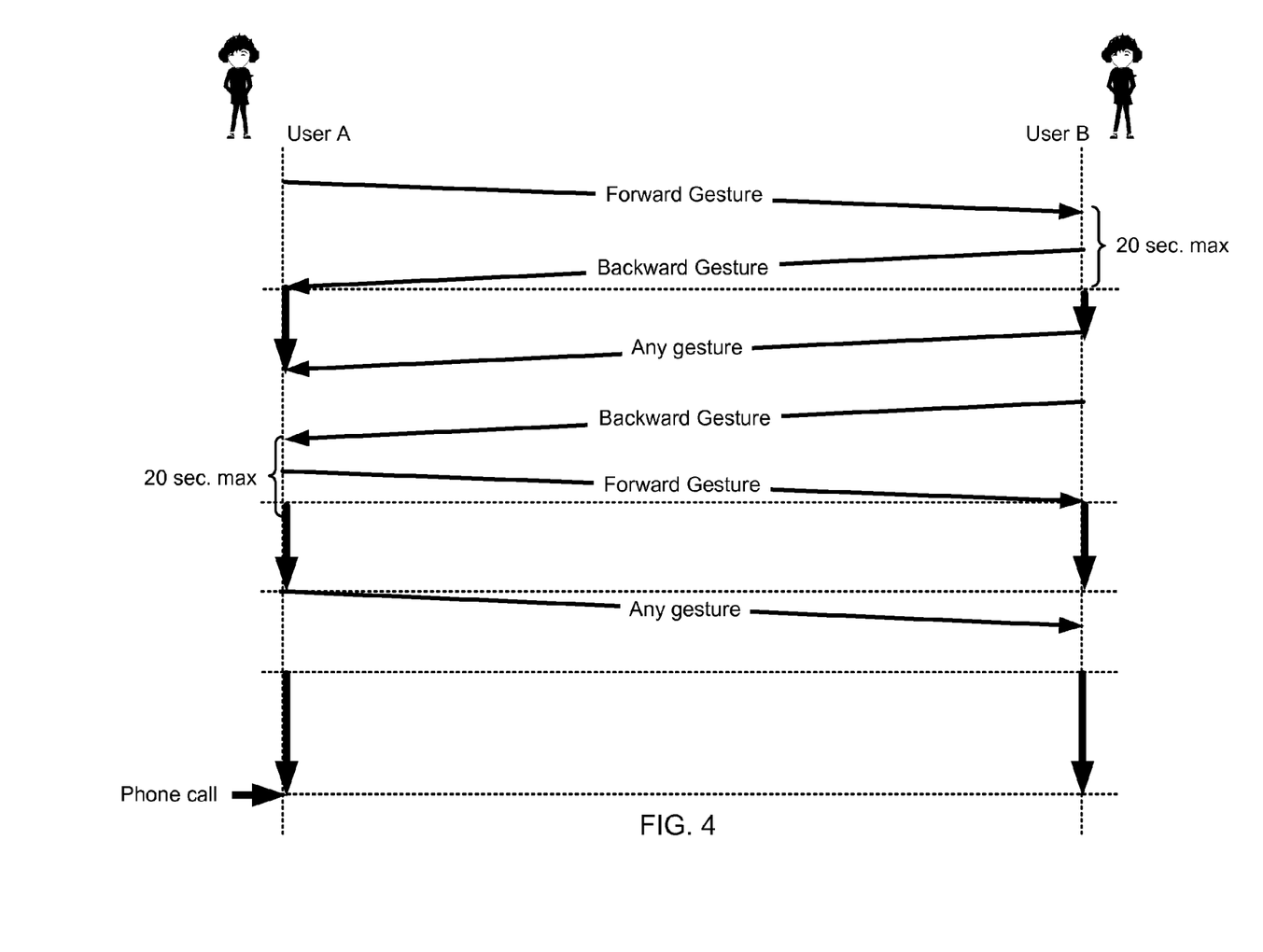

Embodiments of the invention describe the desired experience in the interaction between two humans where one (A) shares music (or other media) with the other (B), as shown in FIG. 1. A and B may be wearing wireless (e.g., Bluetooth) headphones (for example of a media output device) with similar capabilities. User A may be listening to content streamed to his headphone from his media source device and in turn that content may be wirelessly streamed to the headphone of B.

In embodiments of the invention, any sort of content may be shared that is streamed from a user's headphone including phone or VoIP calls. For example, a user may want to share a call with others in the room. In other embodiments of the invention, A may be precluded from sharing with B any content that is streamed to his headphone from any other source that required interaction with another human (e.g., phone/VoIP call) for simplicity and focus on entertainment (e.g., sound).

Described here are the two upper levels of the three levels that may constitute the Sharing Interaction. Social Interaction includes interaction between two users who wear wireless headphones (for example). The interaction may be verbal, body language and facial expressions, and can be supplemented by rituals, all of which can be established already from other "sharing" experiences (e.g. cigarettes, music, food, etc.) or new ones that emerge around the wireless sharing experience. At this time we cannot speculate on how these will evolve, and they are highly culture related, so we limit the discussion to examples of universal principles such as directionality, pointing to identify, etc. User Experience (UX) includes the interaction between each of the users and his/her wireless headphones (for example). Wireless Protocol (e.g. Bluetooth) includes the various protocols and profile that satisfy the upper two layers.

As shown in FIGS. 1-4, at the beginning of each sharing interaction there may be a verbal agreement that establishes who is to share music (or other media) and who is to receive it. Since both users may wear headphones with similar sharing capabilities, for simplicity we assume that A is the one who shares music with B.

Following the verbal agreement, each of the users may indicate to his headphone his role in the interaction. For example, user A may indicate to his headphone his intention to get into Share Mode and that he is the one who will share (Ready_to_share). User B may indicate to his headphone his intention to get into Share Mode and that he is the one who will receive the content (Ready_to_receive).

The above two events can happen in any order, but preferably happen within a predefined time (e.g., 20 seconds). The primary requirements for the above user actions may driven by usability (e.g., stereotypes, memory load, etc.), but in addition it is also desirable that the same actions may be perceived and understood by the other user as part of the social interaction as well as for usability reasons.

In one embodiment of the invention, a momentary switch may be utilized that the user can move forward to indicate "I am ready to share" (referred to as Forward Gesture) or backward (referred to as Backward Gesture) to indicate "I am ready to receive." To cancel or terminate sharing, either gestures may be used. A switch with a long enough travel may be observed by the other user depending on other variables such as attention, proximity, gesture, etc.

Examples of Initiation of Sharing
User Case I1
1. A and B verbally agree that A will share his music with B
2. A gestures forward
3. B gestures backward within 20 sec.
4. A shares with B
Use Case I2
1. A and B verbally agree that A will share his music with B
2. B gestures backward
3. A gestures forward within 20 sec.
4. A shares with B
Use Case I3
1. A and B verbally agree that A will share his music with B
2. A gestures forward
3. B does not gesture within 20 sec.
4. A gets indication of no response from B
Use Case I4
1. A and B verbally agree that A will share his music with B
2. B gestures backward
3. A does not gesture within 20 sec.
4. B gets indication of no response from A
Use Case I5
1. A and B verbally agree that A will share his music with B
2. B gestures backward
3. B cancels by gesture in any direction
Use Case I6
1. A and B verbally agree that A will share his music with B
2. A gestures forward
3. A cancels by gesture in any direction
Examples of Termination of Sharing
User Case T1
1. A is sharing music with B
2. A gestures in any direction
3. A stops sharing with B
4. B gets an indication and is switched back to previous content
Use Case T2
1. A is sharing music with B
2. B gestures in any direction
3. A gets an indication and stops sharing
4. B is switched back to previous content
Use Case T3
1. A is sharing music with B
2. A accepts or initiates a phone call
3. A stops sharing with B and B gets an indication
4. B is switched back to previous content
Use Case T4
1. A is sharing music with B
2. B accepts or initiates a phone call
3. A gets an indication and A stops sharing with B In embodiments of the invention, the streaming between A and B may be maintained until termination is initiated by a user, one of the user goes out of range (e.g., for Bluetooth may be farther than 10-15 meters), a user receives a phone call, a predetermined period of time elapses, etc.

In embodiments of the invention, changes in setting made by user A would not affect the setting for user B (e.g., the volume level of A does not affect the volume level of B). In other embodiments changes in settings made by user A may affect settings for user B.

Embodiments of the invention provide a number of benefits and advantages. For example, being able to share media (e.g., audio) between media output devices (e.g., headphones) wirelessly is a desired feature and differentiator. Making that easy to use in a cost-effective platform is a benefit. Broadcasting from one media source to multiple devices at once may require managing multiple independent streams and may require multiple times the bandwidth and processing. To address the issues such as bandwidth and power limitations of Bluetooth and other technologies, embodiments of the invention allow moving processing to additional devices so that a user does not have to be broadcasting from a media source to multiple devices at once. Thus, for power and bandwidth conservation, it is advantageous to allow an easy way to share and actively terminate sharing, as provided by embodiments of the invention. Moreover, media output devices such as headphones, etc. may have limited user interfaces because of their size and form factor. Thus, embodiments of the invention provide simple and efficient ways to establish sharing and termination of sharing with such devices.

Exemplary Media Output Device

For purposes of illustration, utilizing headphones is discussed as an example throughout this application. The specific configurations discussed herein are merely illustrative examples. Various other devices and interfaces may be used with embodiments of the invention. In addition to headphones, other examples of media output devices include wireless speakers, in-ear monitors (IEMs), ear-buds, headsets, headphone, speakers, displays, portable displays, tablets, laptops, electronic photo-frames, etc.

An exemplary headphone may comprise the following components: a speaker, a microphone, a microcomputer (e.g., to manage the UI and the communications elements), user interface elements (buttons, lights), wireless communications element that communicates audio data from a media source to the headphone (optional if audio is delivered from the media source to the headphone with a wire), wireless communications element that communicates audio data from the headphone to another headphone (this may be the same radio as above), Near Field contact or contactless (wireless) data communications element (this is optional if the Wireless communications elements above are used for this purpose), and a battery. The Near Field device may be NFC, Optical (IR, LED Lights), Ultrasonic, Contacts, Inductive, RF or other suitable technology.

Figure 5:
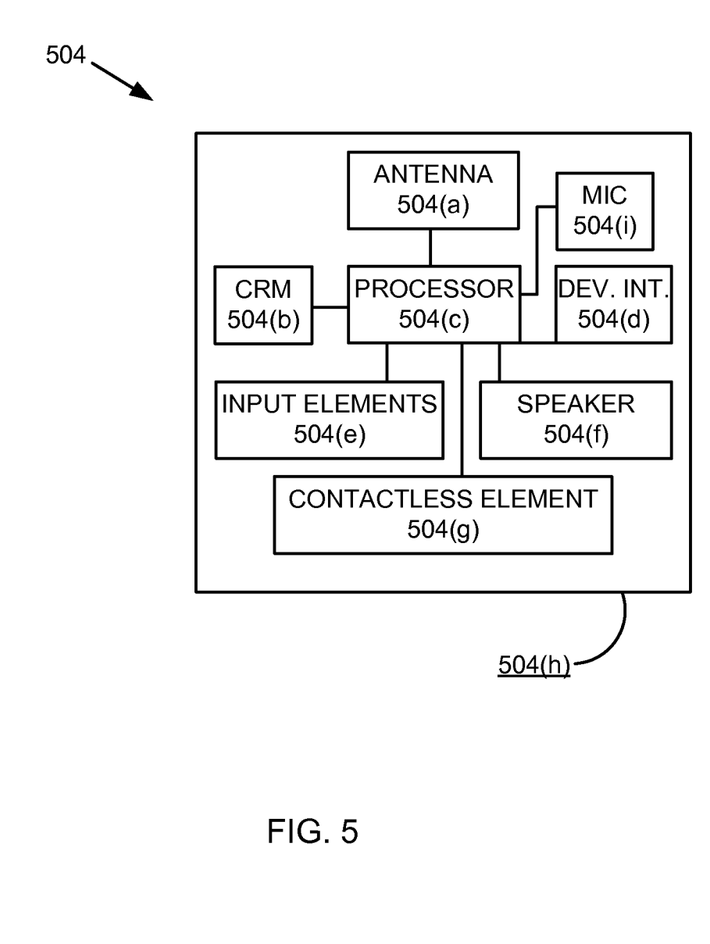
FIG. 5 shows a block diagram of an exemplary media output device.

FIG. 5 shows a block diagram of some components of an exemplary media output device 504. The media output device 504 may comprise a body 504(h). The media output device 504 may comprise a microcomputer which may comprise components such as a processor 504(c) and a computer readable medium 504(b). The computer readable medium 504(b) may be present within body 504(h), or may be detachable from it. The body 504(h) may be in the form a plastic substrate, housing, or other structure. The computer readable medium 504(b) may be a memory that stores data and may be in any suitable form including a memory chip, etc.

The computer readable medium 504(b) may comprise code for performing any of the functions described herein. For example, it may comprise code performing any of the functions described herein.

The media output device 504 may further include a contactless element 504(g), which is typically implemented in the form of a semiconductor chip (or other data storage element) with an associated wireless transfer (e.g., data transmission) element, such as an antenna. Contactless element 504(g) is associated with (e.g., embedded within) media output device 504 and data or control instructions transmitted via a cellular network may be applied to contactless element 504(g) by means of a contactless element interface (not shown). The contactless element interface functions to permit the exchange of data and/or control instructions between the media output device circuitry (and hence the cellular network) and an optional contactless element 504(g).

Contactless element 504(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth, infra-red, or other data transfer capability that can be used to exchange data between the media output device 504 and another media output device or it can be used to exchange data between the media output device 504 and a media source device (e.g., mobile phone, tablet PC, laptop, etc.). Thus, the media output device 504 is capable of communicating and transferring data and/or control instructions via both cellular network and near field communications capability. Other technologies are mentioned above (e.g., Proximity Pairing Technology, Optical TX/RX pairs, Inductive TX/RX pairs, Ultrasonics, physical electrical contacts, etc.).

The media output device 504 may also include a processor 504(c) (e.g., a microprocessor) for processing the functions of the media output device 504 and a device interface(s) 504(d) to allow a user to connect the media output device 504 to other devices such as a media source device (e.g., via a wire or cable). The media output device 504 may further include input elements 504(e) to allow a user to input information into the device (e.g., a switch or button to enable media sharing), a speaker 504(f) to allow the user to hear voice communication, music, etc., and a microphone 504(i) to allow the user to transmit her voice through the media output device 504. The media output device 504 may also include an antenna 504(a) for wireless data transfer (e.g., data transmission).

Exemplary Media Source Devices

Examples of music or media sources include mobile phones, smart phones (e.g., iPhone), tablet PCs, personal digital assistants (PDAs), MP3 players (e.g., iPod), portable radios, portable DVD players, receivers, laptops, tablets (e.g., iPads), personal computers (PCs), etc. An exemplary media source device such as an iPod may comprise the following components: digital storage for audio data, User Interface (UI), wireless transmission technology for transmitting wireless audio to headphone (optional if using a wired interface), microcomputer(s) (which manages the UI, reads audio data from memory, performs necessary processing of audio file for streaming to wireless or wired interface), and a battery. A media source device may also contain an interface to receive audio data from other wireless networks, cellular networks, broadcast radio, or pre-packaged media (such as CD).

Figure 6:
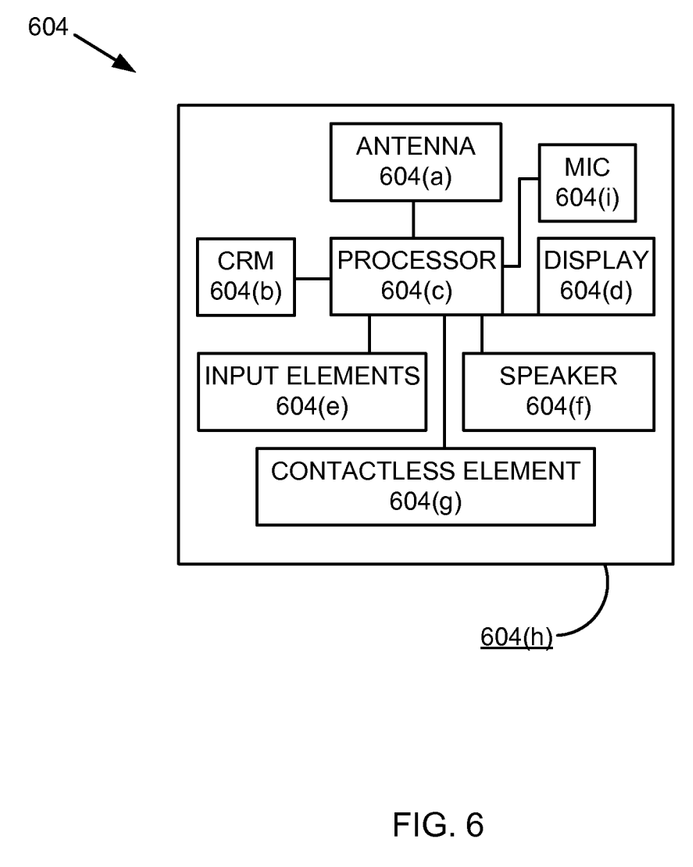
FIGS. 6-7 show block diagrams of exemplary media source devices.

FIG. 6 shows a block diagram of some components of an exemplary media source device 604. The media source device 604 may comprise a computer readable medium 604(b) and a body 604(h). The computer readable medium 604(b) may be present within body 604(h), or may be detachable from it. The body 604(h) may be in the form a plastic substrate, housing, or other structure. The computer readable medium 604(b) may be a memory that stores data and may be in any suitable form including a memory chip, etc. The computer readable medium 604(b) may comprise code for performing any of the functions described herein.

The media source device 604 may further include a contactless element 604(*g*), which is typically implemented in the form of a semiconductor chip (or other data storage element) with an associated wireless transfer (e.g., data transmission) element, such as an antenna. Contactless element 604(*g*) is associated with (e.g., embedded within) media source device 604 and data or control instructions transmitted via a cellular network may be applied to contactless element 604(*g*) by means of a contactless element interface (not shown). The contactless element interface functions to permit the exchange of data and/or control instructions between the media source device circuitry (and hence the cellular network) and an optional contactless element 604(*g*).

Contactless element 604(*g*) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth, infra-red, or other data transfer capability that can be used to exchange data between the media source device 604 and another media source device or it can be used to exchange data between the media source device 604 and a media output device (e.g., a headset, speakers, etc.). Thus, the media source device 604 is capable of communicating and transferring data and/or control instructions via both cellular network and near field communications capability. Other technologies are mentioned above (e.g., Proximity Pairing Technology, Optical TX/RX pairs, Inductive TX/RX pairs, Ultrasonics, physical electrical contacts, etc.).

The media source device 604 may also include a processor 604(*c*) (e.g., a microprocessor) for processing the functions of the media source device 604 and a display media source device 604(*d*) to allow a user to see information and messages. The media source device 604 may further include input elements 604(*e*) to allow a user to input information into the device, a speaker 604(*f*) to allow the user to hear voice communication, music, etc., and a microphone 604(*i*) to allow the user to transmit her voice through the media source device 604. The media source device 604 may also include an antenna 604(*a*) for wireless data transfer (e.g., data transmission).

Figure 7:
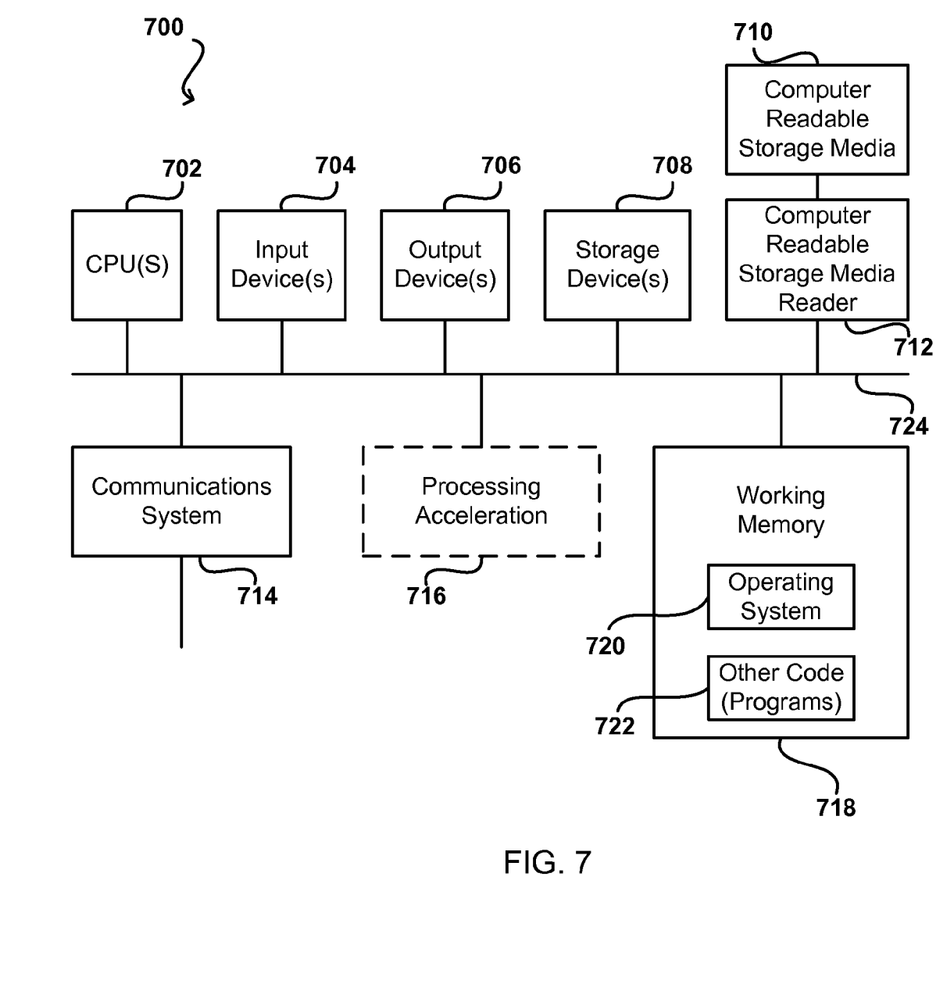

FIG. 7 illustrates another exemplary media source device 700, in which various embodiments may be implemented. The system 700 may be used to implement any of the computer systems and media source devices described above. The system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, headset, speakers, etc.). The system 700 may also include one or more storage devices 708. By way of example, the storage device(s) 708 can include devices such as disk drives, optical storage devices, solid-state storage device such as a random access memory ("RAM") and/or a read-only memory ("ROM"), which can be programmable, flash-updateable and/or the like.

The system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the system 700 may also include a processing acceleration unit 716, which can include a digital signal processor DSP, a special-purpose processor, and/or the like.

The computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing, storing, transmitting, and retrieving computer-readable information. The communications system 714 may permit data to be exchanged with the network and/or any other computer described above with respect to the system 700.

The system 700 may also comprise software elements, shown as being currently located within a working memory 718, including an operating system 720 and/or other code 722, such as an application program (which may be a client application, Web browser, mid-tier application, RDBMS, etc.). It should be appreciated that alternate embodiments of a system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

What is claimed is:

1. A method comprising:
receiving, at a first speaker device, streaming media from a media source device, wherein the first speaker device requires a separate media source device to provide streaming media;
detecting, by a motion sensor in a first control unit mounted in the first speaker device, that a first predefined motion has occurred by the first speaker device;
resolving, by the first control unit in the first speaker device, the first predefined motion to a share-out command to share the streaming media the first speaker device is receiving from the media source device, with a second speaker device that is not currently paired with the first speaker device, wherein the first predefined motion is in a first direction;
receiving, at a wireless transfer element mounted in the first speaker device, an indication from the second speaker device that a second control unit in the second speaker device has detected a second predefined motion that is resolved to a share-in command indicating that sharing the streaming media is desired, wherein the second predefined motion is in a second direction, opposite from the first direction;
determining, by the first control unit in the first speaker device, that the indication from the second speaker device was received within a predetermined period of time;
initiating, by the first control unit in the first speaker device, a pairing with the second speaker device; and
initiating, by the first control unit in the first speaker output device, sharing of the streaming media the first device is receiving from the media source device to establish a link between the first speaker device and the second speaker device for sharing of the streaming media using the wireless transfer element, such that the first control unit controls the retransmission of the streaming media from the first speaker device to the second speaker device.

2. The method of claim 1 further comprising:
receiving a command to terminate the sharing of the streaming media; and
in response to the command, initiating a termination of the sharing of the streaming media.

3. The method of claim 1 wherein the first predefined motion includes a gesture by the first speaker device.

4. The method of claim 2 wherein the command to terminate sharing of the streaming media includes a bump between the first speaker device and the second speaker device, an engaged button or switch on the first speaker device or the second speaker device, a motion or gesture by the first speaker device or the second speaker device, or a voice command on the first speaker device or the second speaker device.

5. The method of claim 1 wherein sharing of the streaming media continues until a command to terminate the sharing of the streaming media is received at the first speaker device or the second speaker device.

6. The method of claim 1 wherein the first speaker device is a headphone, speaker, or earbud.

7. The method of claim 1 wherein the media source device is a mobile phone, smart phone, tablet, personal digital assistant, MP3 player, portable radio, portable DVD player, receiver, laptop, or personal computer.

8. The method of claim 1 wherein the first predefined motion is detected by motion sensors in the first speaker device.

9. The method of claim 1 wherein the second predefined motion is detected by motion sensors in the second speaker device.

10. The method of claim 1 wherein the first speaker device is a headphone or earbud, and wherein the first predefined motion is caused by a user of the first speaker device moving his head in the first direction while wearing the first speaker device.

11. A first speaker device, wherein the first speaker device requires a separate media source device to provide streaming media, the first speaker device comprising:
a processor; and
a non-transitory computer readable medium, coupled with the processor, the non-transitory computer readable medium comprising code for performing the following functions:
receiving streaming media from the separate media source device;
detecting, by a first control unit mounted in the first speaker device, that a first predefined motion has occurred by the first speaker device;
resolving, by the first speaker device, the first predefined motion to a share-out command to share the streaming media the first speaker device is receiving from the separate media source device, with a second speaker device that is not currently paired with the first speaker device, wherein the first predefined motion is in a first direction;
receiving an indication from the second speaker device by a second predefined motion that is detected and resolved to a share-in command indicating that sharing the streaming media is desired, wherein the second predefined motion is in a second direction, opposite from the first direction;
determining that the indication from the second speaker device was received within a predetermined period of time;
initiating, by the first speaker device, a pairing with the second speaker device; and
initiating sharing of the streaming media the first device is receiving from the separate media source device to establish a link between the first speaker device and the second speaker device for sharing of the streaming media, such that the first control unit controls the re-transmission of the streaming media from the first speaker device to the second speaker device.

12. The speaker device of claim 11, the non-transitory computer readable medium further comprising code for performing the following functions:
receiving a command to terminate the sharing of the streaming media; and
in response to the command, initiating termination of the sharing of the streaming media.

* * * * *